United States Patent [19]

Hesthamar et al.

[11] Patent Number: 5,412,582
[45] Date of Patent: May 2, 1995

[54] SURVEILLANCE SYSTEM

[76] Inventors: Tore Hesthamar, Torsgatan 38, S431 38 Mölndal; Fredrik Althoff, Toltorpsgatan 39 B, S-431 39 Mölndal; Thomas Larsson, Toppvägen 2, S-421 66 Västra Frölunda, all of Sweden

[21] Appl. No.: 905,366

[22] Filed: Jun. 29, 1992

[30] Foreign Application Priority Data

Jul. 8, 1991 [SE] Sweden .................. 9102120

[51] Int. Cl.⁶ .................................. G01L 1/00
[52] U.S. Cl. .................. 364/508; 73/862.333; 73/862.474
[58] Field of Search .............. 364/507, 508; 73/862.333, 862.474

[56] References Cited

U.S. PATENT DOCUMENTS

| | | | |
|---|---|---|---|
| 3,187,433 | 2/1973 | Even | 73/862.333 |
| 4,106,176 | 8/1978 | Rice et al. | 364/508 |
| 4,114,428 | 9/1978 | Popenoe | 73/88 F |
| 4,768,388 | 9/1988 | Fader et al. | 364/508 |
| 4,882,936 | 11/1989 | Garshelis | 73/862.36 |
| 4,969,105 | 11/1990 | Gaensle | 364/508 |
| 5,257,207 | 10/1993 | Warren | 364/508 |

FOREIGN PATENT DOCUMENTS

| | | |
|---|---|---|
| 0422702 | 4/1991 | European Pat. Off. |
| 3819083 | 12/1989 | Germany |
| 3040220 | 6/1990 | Germany |
| 59-151030 | 8/1984 | Japan |
| 63-33634 | 2/1988 | Japan |

OTHER PUBLICATIONS

Sassada et al.; "A New Method of Assembling a Torque Transducer by the Use of Bilayer-Structure Amorphous Ribbons"; IEEE Transactions on Magnetics, vol. 19, No. 5, Sep. 1983.

*Primary Examiner*—Ellis B. Ramirez
*Attorney, Agent, or Firm*—Burns, Doane, Swecker & Mathis

[57] ABSTRACT

The present invention relates to a surveillance system for measuring and surveying e.g. the preload in screws (23) or similar. It comprises a number of sensor systems (1) electrically connected to a common electronic and computing system, each said sensor system (1) comprising sensor means (2) being provided with a magneto-elastic material (6) sensitive to the preloads and a sensing device (3) comprising a coil system at least partly surrounding the sensitive material (6). The sensitive material (6) is excited via the coil system with a frequency of at least 300 kHz so as to make the system insensitive to external disturbing fields.

39 Claims, 6 Drawing Sheets

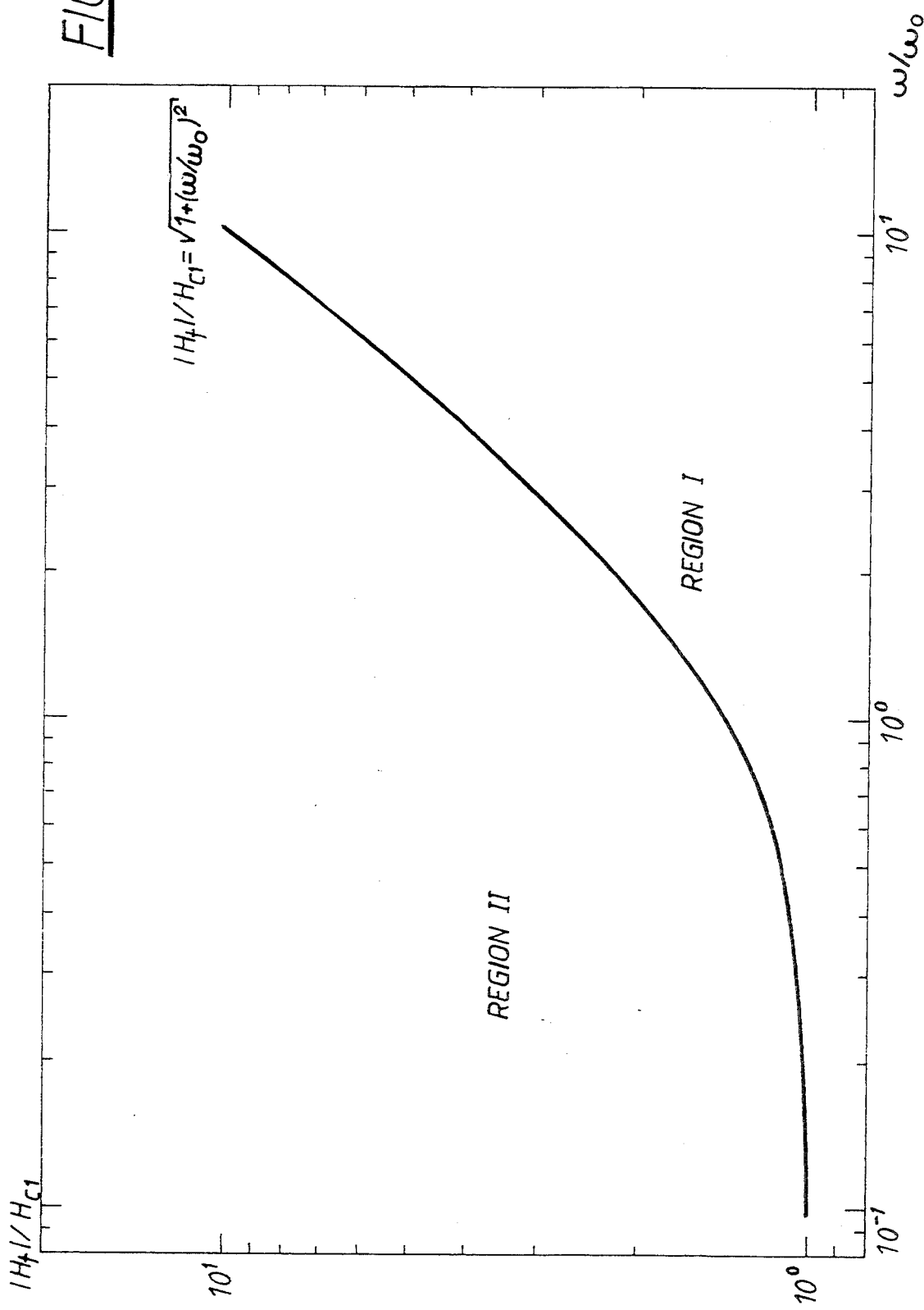

SURVEILLANCE SYSTEM

TECHNICAL FIELD

The present invention relates to a surveillance system for measuring and surveying for example the preload in screws, bolts or similar, comprising at least one sensor system, each said sensor system comprising sensor means, said sensor means comprising a magnetoelastic material sensitive to the loads to which the screws, bolts or similar are exposed, a sensing device comprising a coil system each said sensor means further being partly or completely surrounded by said coil system, each coil system further being electrically connected to an electronic system and to a common computing system.

Surveillance systems of the above mentioned kind are primarily intended to be used where the preloads in a comparatively large number of objects (e.g. screws, bolts or similar) have to be measured and surveyed regularly or more or less continuously. For example, when so called slewing rings (bearings with a large diameter and comparatively thin sections) are concerned a large number of screws or bolts are used which have to be surveyed more or less continuously. It is of the utmost importance that the measurements can be carried out in an efficient, simple and stable way and at an as low cost as possible.

A sensor system which serves a similar purpose i.e. to easily and quickly being able to measure the preloads in screws, bolts etc e.g. in slewing rings, but where e.g. the necessity of more or less continuous measurements is somewhat less pronounced but where on the other hand it might be of greater importance not to have any electrical connections involved is disclosed in the copending patent application Ser. No. 07/905,374 "Sensor System".

TECHNICAL BACKGROUND

Several surveillance systems are known, but suffer the drawbacks of being rather clumsy to use mainly due to electrical connections being thin and sensitive to dirt, oil, humidity, and so forth. As for example so called strain gauges are concerned the electrical conduits normally have to be soldered to the object, which makes prefabrication impossible and the manufacturing costs get important.

Most of the abovementioned is also true for so called piezoresistive/ceramic gauges which further are very brittle and thus very sensitive to e.g. cracks.

Alternatively so called ultrasonic techniques can be used. This is however both expensive and time consuming partly because the ultrasonic device has to be mounted separately for every object, thus the need for a more continuous survey cannot be met by these techniques.

In DE-C-38 19 083 a magnetoelastic sensor system is disclosed which comprises sensor means comprising a magnetoelastic material sensitive to the preloads to which a bolt is exposed, said system further comprising a coil system, surrounding the magnetoelastic material.

There is however no indication of a complete surveillance system.

The system is furthermore clumsy to handle and sensitive to stray fields. In EP-A-0 422 702 a magnetoelastic torque transducer is shown. Also here no surveillance system is discussed and the magnetoelastic material is excited with a frequency of 1-100 kHz, 20 kHz being the preferred frequency in order to avoid whistling. Also this sensor is sensitive to stray fields which makes it unpractical.

It is well known to measure torque applied to a rotary or fixed shaft by use of magnetoelastic materials which form a part of, or are arranged on the shaft, since it is known that the permeability of magnetic materials changes due to applied stress. The permeabilities of the magnetoelastic materials change due to the fact that a magnetoelastic material changes its magnetic properties when it is subject to tensile and compressive stresses, respectively. Therefore, the torque and/or axial stresses to which an object is exposed must either be transmitted to tensile and compressive stresses of the magnetoelastic material which is fastened onto the object, or the object itself (or a part of it) comprises a magnetoelastic material.

SUMMARY OF THE INVENTION

The aim with the present application is consequently to make a surveillance system which has a high sensitivity to the preloads to be measured, is fast and easy to handle, insensitive to external stray fields and disturbances, cheap and easy to manufacture and mount. These as well as other objects are achieved through the preferred embodiment.

An explanation to why such good results are obtained by use of a high excitation frequency resides in that magnetization is due to small angle magnetization rotation instead of domain wall motion, said magnetization processes occurring in two different regions, depending on excitation frequency and excitation level i.e. the strength of the exciting field. At high frequencies and comparatively low excitation levels small angle magnetization rotation (SAMR) dominates. Different from magnetization caused by domain wall motion, magnetization due to SAMR is not remanent.

The magnetoelastic/amorphous materials which are excited with a high frequency is given in the copending patent application Ser. No. 07/905,365 "Sensor and method for measuring torque and/or axial stresses", with the same filing date, the subject-matter of which is incorporated herein.

According to a preferred embodiment of the invention an excitation frequency of at least 300 kHz should be used, preferably between 500 kHz and 10 MHz, and most preferably 1–2 MHz. The waveform of the excitation frequency may be of any form, but according to a preferred embodiment is sinusoidal. In all known sensors a frequency of at most 100 kHz is used and a frequency of 20–30 kHz is regarded within this field as a high frequency. A reason why such considerably higher frequencies give such good results is that the magnetization process is changed. This makes the sensor signal essentially independent of any normally occurring stray field and furthermore its dependence on the excitation level decreases. As to the magnetization process involved this essentially comprises two basic mechanisms, namely the so called domain wall motion and the magnetization rotation (SAMR-mode; Small Angle Magnetization Rotation). At ordinary excitation frequencies and levels, the domain wall motion magnetization mechanism dominates, but at higher frequencies or lower excitation levels the SAMR-model dominates. This implies that a sensor can operate in essentially two different regions, namely region II where the domain wall motion dominates and region I where the SAMR-model dominates. Upon magnetization by domain wall motion different areas of parallel spin are increased and decreased in volume respectively and the material is magnetized. A material magnetized by this process requires quite large excitation levels since the walls are pinned down on irregularities in the material but when the level is high enough it suddenly jumps to a new pinning site which gives a very noisy magnetization behavior. It is also possible to pump energy into the material by application of stress. The magnetization is further irreversible which means that the material is magnetized even when the exciting field is absent. Domain walls have inertia which means they cannot move infinitely fast. So if the exciting frequency is increased too much the motion of the walls is damped and finally the walls cannot move at all. If the exciting level is too low there will not be enough energy to move the domain walls and therefore the rotation magnetization will dominate.

Briefly, when the excitation frequency is high enough or when the excitation level is low enough rotation magnetization will dominate. This magnetization works so that the individual spins are rotated a small angle from the rest positions. This process is reversible and consequently there is no remanent magnetization when the exciting field is removed. In the region where the rotation magnetization dominates the permeability is essentially independent of the excitation level which is due to the simple relationship: $\mu\alpha\Theta$ (H)/H where $\Theta$ is the rotation angle of the spins and H is the excitation field strength.

The pinning of the domain walls can be described as follows:

$$\beta \frac{dx}{dt} + \alpha x = 2HI_s$$

where $\beta$ is a damping parameter, $\alpha$ is an elastic spring coefficient and $2HI_S$ is the force per unit area on the domain wall. Solving the equation gives:

$$x(t) = x_0 e^{i\omega t}$$

where $$x_0 = \frac{2HM_s}{\alpha} \cdot \frac{1}{1 + i\frac{\omega}{\omega_o}}$$

and $M_S$ = saturation magnetization

Further, $\omega$ is the excitation frequency, $$\omega = \frac{\alpha}{\beta}.$$

There is a threshold amplitude above which the domain wall is torn away from its pinning site, $$x_t = \frac{2H_{c1} M_s}{\alpha} \cdot H_{C1}$$

is the coercive field when $\omega = o$.

Preferred embodiments are given by the characterizing features contained in the appended subclaims.

BRIEF DESCRIPTION OF THE DRAWINGS

The invention will now be further described referring to the accompanying drawings wherein:

FIG. 6 is an illustration of regions of different magnetization processes.

DESCRIPTION OF PREFERRED EMBODIMENTS

Figure 1:
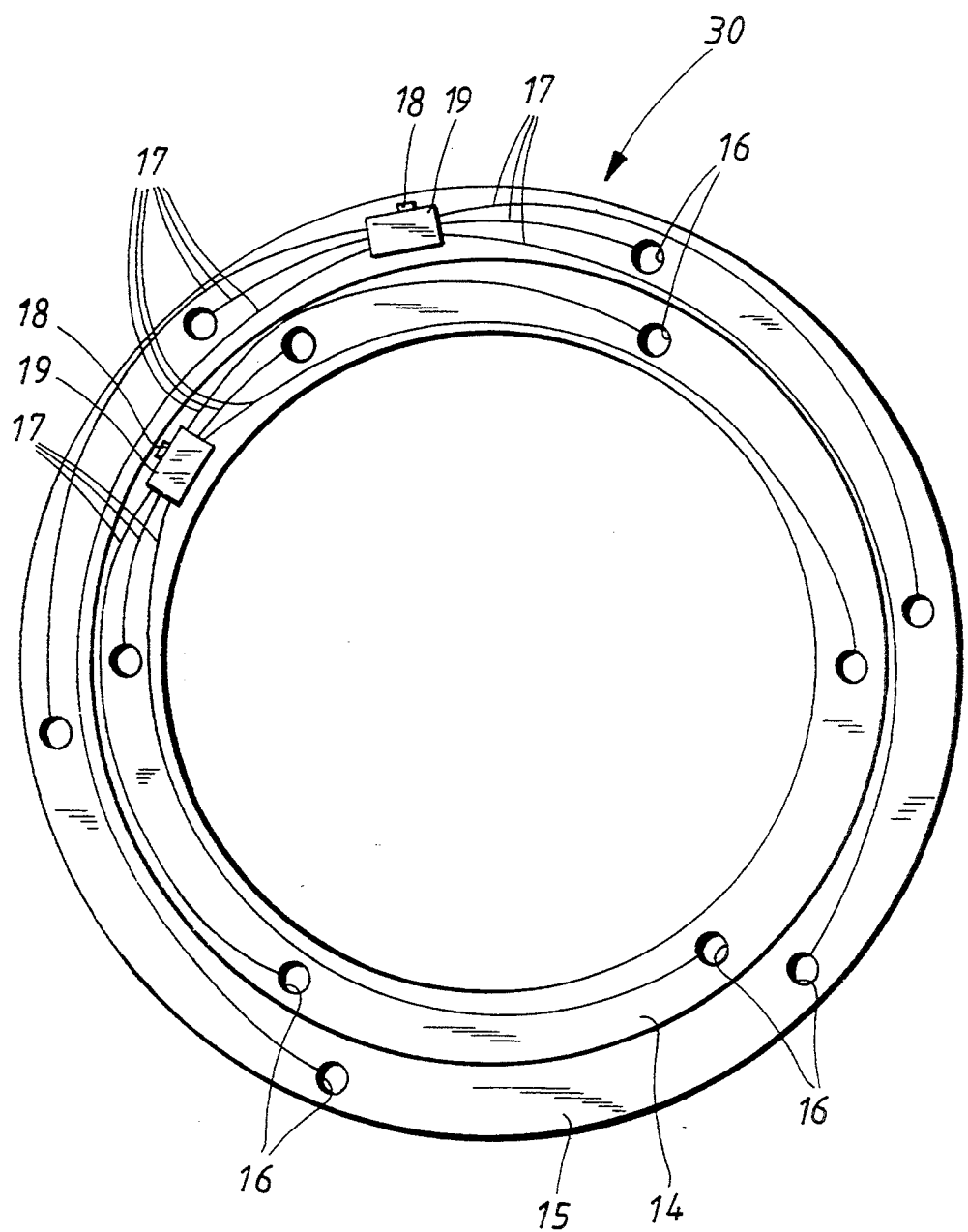
FIG. 1 shows a plan view of a slewing ring.

The slewing ring 30 comprises an inner ring 14 and an outer ring 15 with a number of holes 16 for screws 23 or bolts. On each screw 23 a sensor system 1 is arranged, each sensor system 1 being connected to an electronic and/or multiplexing unit 19 either on the inner ring 14 or on the outer ring 15 via a cabling system 17, said unit/units 17 being connected to external computer facilities via (a) contact/-s 18.

Slewing bearings are often used in applications where only a small degree of rotation takes place (e.g. cranes or similar). It is therefore, in many applications, possible to have the surveillance system in use all the time for both the static and the rotating ring of the bearing.

Figure 2:
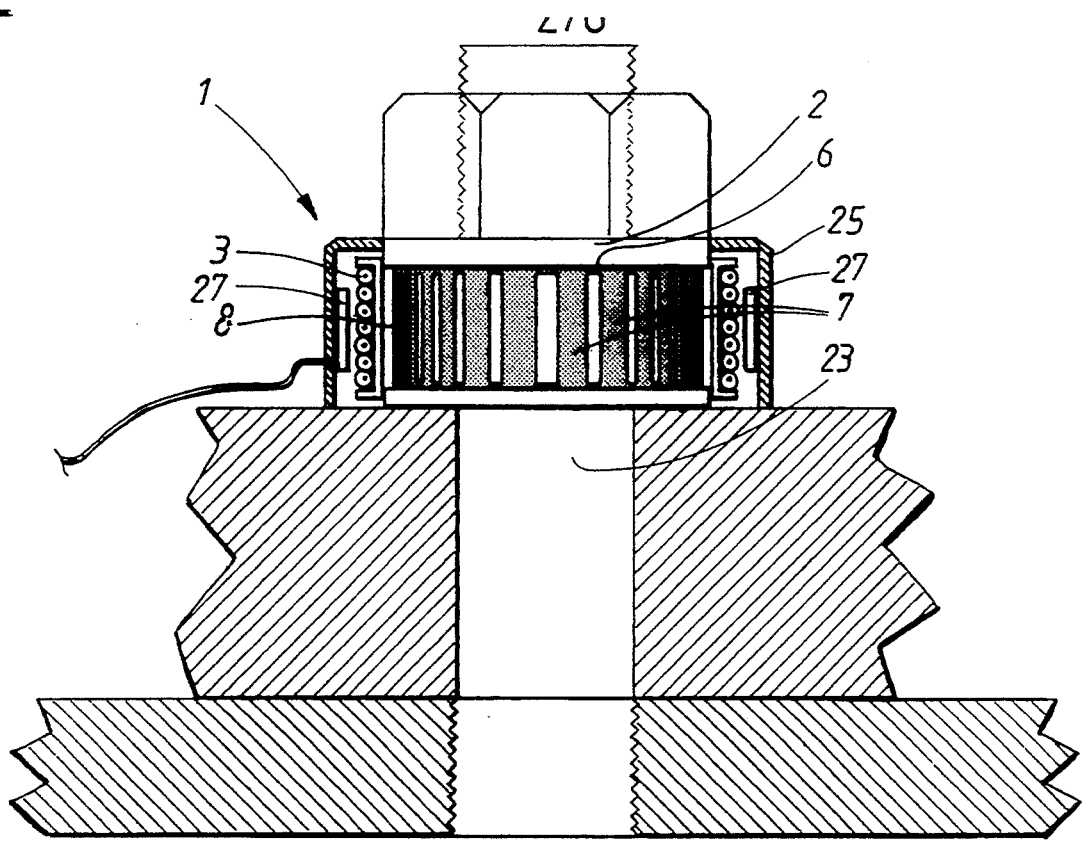
FIG. 2 shows a sensor system mounted on a screw of e.g. a slewing ring.

The sensor system 1 can be mounted either externally on e.g. a slewing ring 30 as illustrated in FIG. 2 or in a recess 22 of the same.

The sensor system 1 may of course be mounted on any object, it does not have to be a slewing ring.

The sensor system 1 comprises a sensor means 2 in the form of e.g. a washer, said washer being provided with a magnetoelastic (amorphous) material 6 in the form of a ribbon belt 8 with magnetoelastic ribbons 7, said ribbons 7 being located axially in relation to the axis of the screw 23. The magnetoelastic ribbons may be made from a wide amorphous ribbon through etching. The magnetoelastic material is excited with a frequency of at least 300 kHz, preferably between 500 kHz and 10 MHz. A particularly convenient excitation frequency has shown to be approximately 1–2 MHz.

Figure 3:
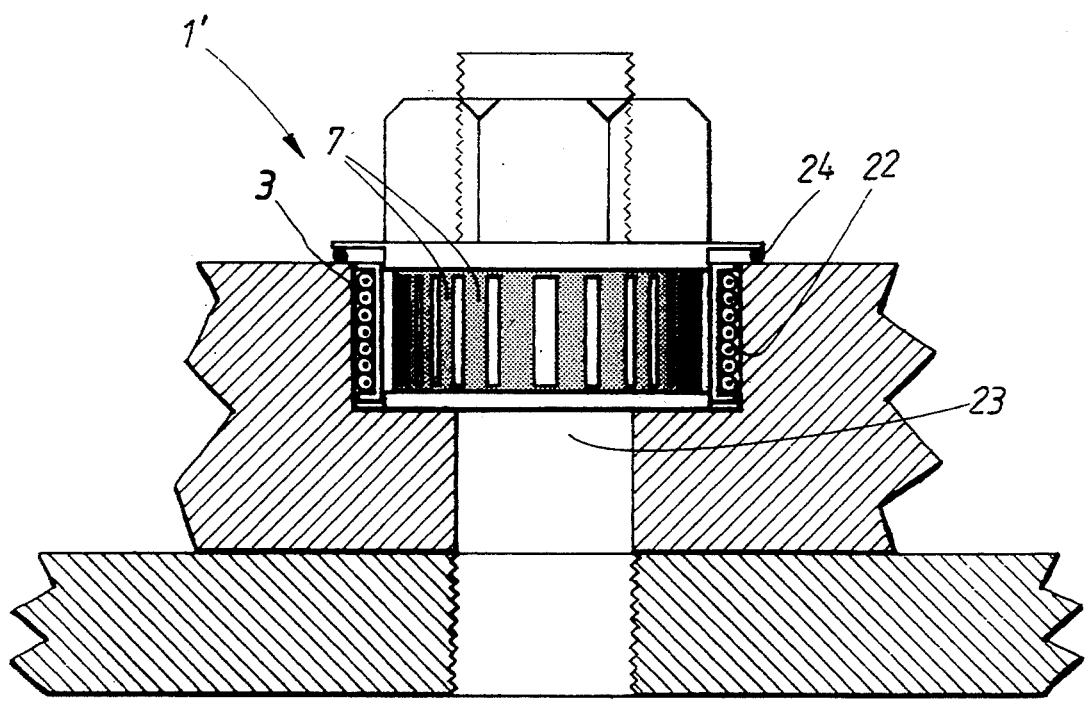
FIG. 3 shows a sensor system mounted on a screw and mounted in a recess of e.g. a slewing ring.

The sensor means 2 is axially (partly or completely) encompassed by a sensing device 3 comprising a coil system, said coil system comprising either separately pick-up-coil/s and an excitation coil or (a) pick-up-coil/-s carrying out even the excitation functions. Demodulating electronics 27 is included in each sensing device 3 or sensor system 1. (See further FIG. 4b which further describes the electronics 27). In many applications it is advantageous to have the sensor system 1 taken up in a recess 22 as illustrated in FIG. 3 since the system is then less exposed to external, mainly mechanical disturbances also in the form of dirt, oil and so on.

The sensor system is sealed off against the external environment e.g. via a conventional O-ring 24. However, it is not always possible (or necessary) to have the sensor system 1 taken up in recesses e.g. due to thin slewing rings 30. Then the sensor system is mounted externally as shown in FIG. 2, where it is provided with a shielding structure 25. In FIG. 3 the electronics 27 is not indicated but it can be arranged in a way analogous to that in FIG. 2. Alternatively the sensor systems could be connected to a common electronic system.

Figure 4A:
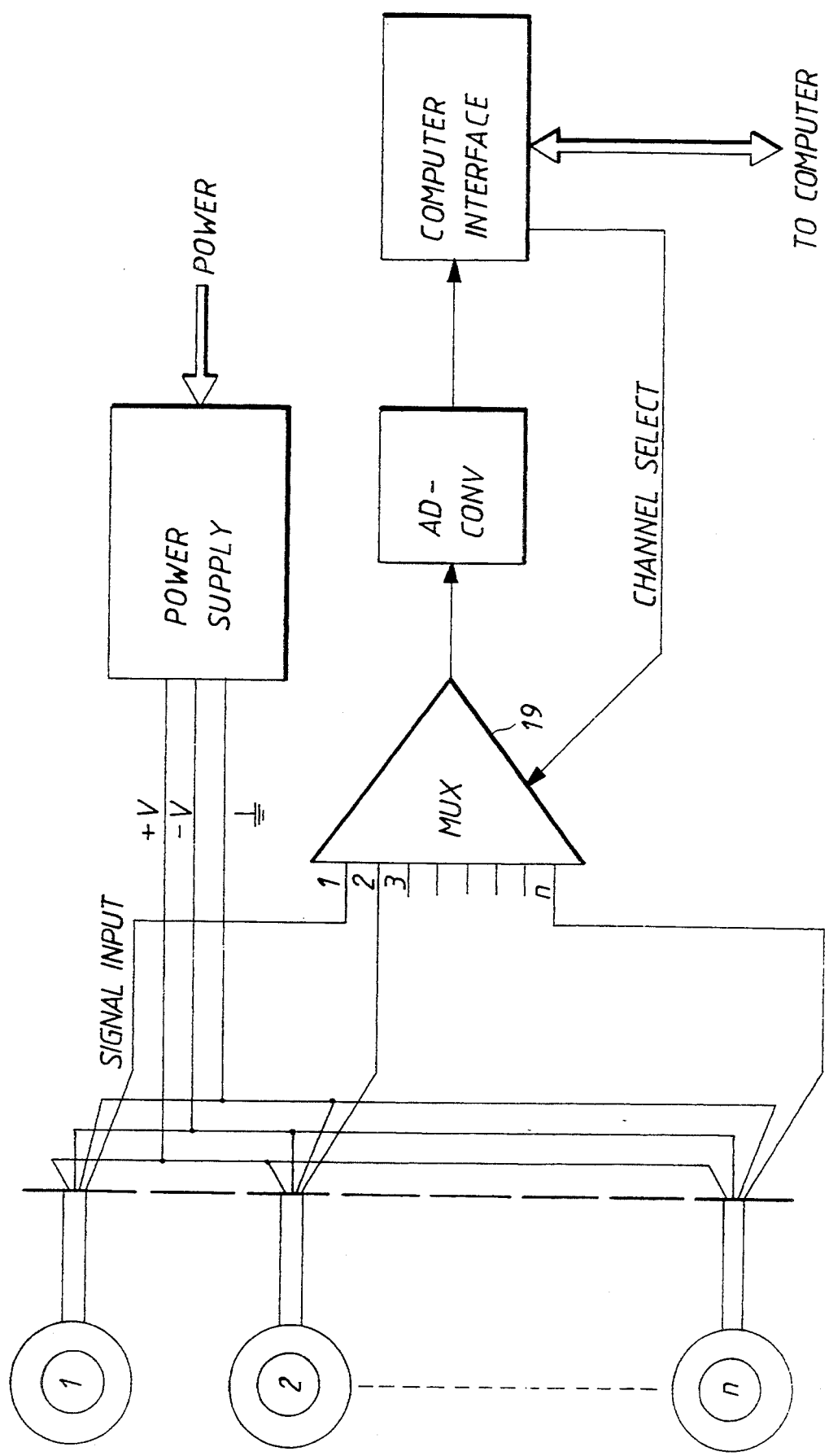
FIG. 4a illustrates schematically a surveillance system comprising n sensor systems.

FIG. 4a shows a scheme of a surveillance system where a number of sensor systems 1 (1-n) are illustrated, said scheme illustrating the general electronics serving n sensor systems 1, e.g. washers. Each sensor system 1 is connected to/comprises a relay multiplexing unit 19 controlled by a computer, through which it can be connected/disconnected so that the values from the separate sensor systems can be obtained individually in any preferred order and/or simultanously. Selection of channel thus is effected through the multiplexing device, MUX, (or multiplexing unit 19, see FIG. 4a).

Figure 4B:
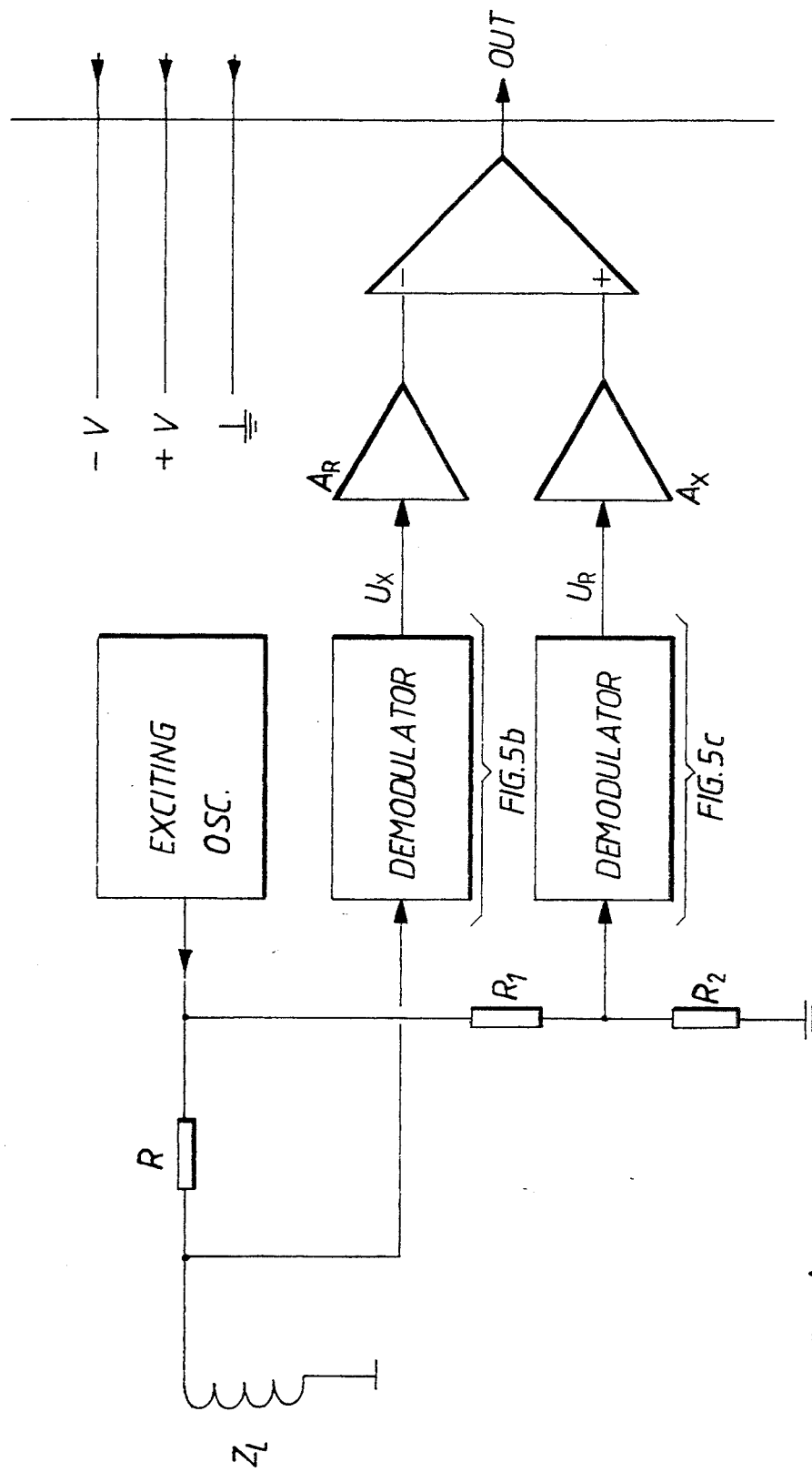
FIG. 4b illustrates the electronics as included in each sensor system.

FIG. 4b comprises the excitation and demodulating electronics that according to a preferable embodiment is comprised by each sensor system 1 of a surveillance system.

Figure 5A:
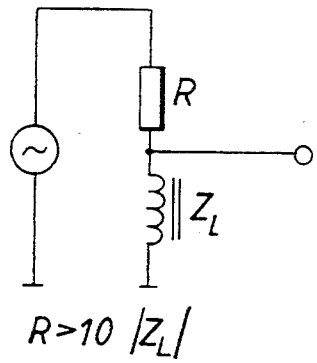
FIG. 5a–5d illustrate demodulation circuits for the sensor systems.
Figure 5B:
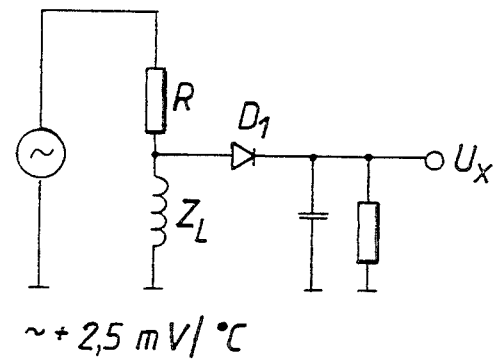
Figure 5C:
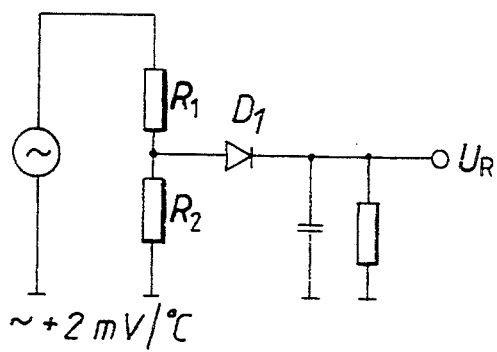
Figure 5D:
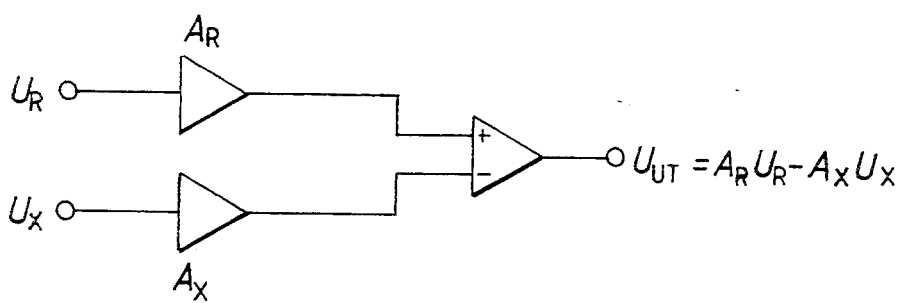

The demodulator as disclosed in FIG. 5b serves to demodulate the sensor signal whereas the demodulator of FIG. 5c is a temperature compensation demodulator.

According to FIG. 4a all sensor systems 1 are connected to a MUX which is controlled e.g. by a computer via a computer interface. The signal out from the MUX 19 is converted through the AD-converter and fed to a computer.

The resistors not referenced in FIGS. 5b and 5c are comprised by the demodulators.

In FIGS. 5a–5d demodulation circuits for temperature compensation of the sensor means is illustrated which hereinafter will be further discussed under reference to a particular embodiment.

Electrically the sensor means (the washer) behaves like an impedance, $Z_L$ (see FIG. 5a) which varies with the load applied to the washer (or washer/nut).

A preferable way to connect the sensor means (hereinafter called washer although it does not have to be a washer, but can be constituted by any suitable means) is as a voltage divider together with a resistor, R.

The voltage divider is fed by an amplitude/frequency stable oscillator working at a suitable frequency. The wave-form may be any but it is preferably sinusoidal.

The resistor R is chosen to be sufficiently large (e.g. $R > 10 \cdot |Z_L|$) to make the output voltage vary linearly with $Z_L$. This resistor R further keeps the excitation current independent of $Z_L$ and of the load applied to the washer. The output from the voltage divider is on AC-voltage and this voltage is converted to a DC-signal ($U_x$) by means of a diode detector. (See FIG. 5b). The signal, $U_x$, varies with temperature, approximately 2,5 mV/° C. This effect is caused by the variations of the voltage drop over the diode, $D_1$, and the temperature dependence of the washer itself. It is assumed that the washer and the diode $D_1$ are kept at the same temperature.

If a further, identical, diode detector is introduced which converts a stable sinusoidal signal $U_R$ independent of the washer, this signal $U_R$ will only comprise the temperature dependence of the diode, $D_1$, (see FIG. 5c), approximately 2 mV/° C. If the signals, $U_x$ and $U_R$, are passed on to two amplifiers with different gains for the two input signals $U_x$ and $U_R$ respectively and then further passed on to a differential amplifier, the temperature dependence of the two signals will be cancelled. (See FIG. 5d).

The output signal $U_{out}$ from the washer sensor means 1 should then read:

$$U_{out} = A_R \cdot U_R - A_x \cdot U_x.$$

According to one embodiment $A_R$ is chosen to 2,5 and $A_x$ to 2 which results in a balanced temperature drift. $A_R$ and $A_x$ may vary from one sensor system to another within the surveillance system.

Preferably a Ni-based amorphous material having an temperature coefficient approximately equal to that for steel is used for the sensor means for keeping the temperature dependence reasonably low.

The temperature dependence of the magnetoelastic material (6) is essentially eliminated through the use of a magnetoelastic material (6) which has a temperature coefficient which is approximately the same as the one of the object (23). (This is true as only one of either tensile or compressive stresses is to be measured. If e.g. the object is of steel, it has shown to be appropriate to use a Ni-based amorphous material).

In FIG. 6 the different region of magnetization due to domain wall motion (region II) and small angle magnetization rotation (SAMR) (region I) respectively. Thus, acccording to the invention the excitation frequency (and excitation level) should be so chosen that it falls into region I).

The invention is however not limited to the shown embodiments but can be varied in a number of ways without departing from the scope of the claims.

We claim:

1. Surveillance system for measuring and surveying the preload in screws, bolts or similar objects, comprising:
   at least one sensor system having sensor means arranged on the screws, bolts or similar objects, said sensor means including a magnetoelastic material sensitive to loads to which the screws, bolts or similar objects are exposed;
   a sensing device having a coil system for exciting said magnetoelastic material;
   each said sensor means further being partly or completely surrounded or covered by said coil system;
   each said coil system further being electrically connected to an electronic system for monitoring loads sensed by said sensor and to a common computing system;
   wherein the magnetoelastic material is excited with a frequency of at least 300 kHz.

2. Surveillance system according to claim 1, wherein the magnetoelastic material is excited with a frequency of between 500 kHz and 10 MHz.

3. Surveillance system according to claim 1, wherein the magnetoelastic material is excited with a frequency of 1–2 MHz.

4. Surveillance system according to claim 1, wherein the magnetoelastic material comprises a magnetoelastic amorphous material.

5. Surveillance system according to claim 1, wherein the magnetoelastic material is applied essentially axially on the sensor means.

6. Surveillance system according to claim 1, wherein the magnetoelastic material comprises magnetoelastic ribbons, said ribbons being attached to the sensor means and forming a ribbon belt.

7. Surveillance system according to claim 1, wherein the sensor means comprises a washer either separate, securely attached to, or in one piece with a screw, bolt, nut or similar.

8. Surveillance system according to claim 1, wherein the coil system partly or completely, essentially axially, encloses the sensor means.

9. Surveillance system according to claim 1, wherein the coil system comprises coils carrying out both an excitation-, and a pick-up-function either separately or in one combined coil.

10. Surveillance system according to claim 1, wherein a magnetoelastic material is chosen such that the temperature coefficient of the material essentially corresponds to that of the object to be measured.

11. Surveillance system according to claim 10, wherein the magnetoelastic material is a Ni-based amorphous material.

12. Surveillance system according to claim 1, wherein electronic temperature compensation is achieved through a first and a second voltage divider each comprising a diode detector, the output signals $U_X$, $U_R$ from the voltage dividers being fed to two amplifiers with different gains and then further on to a differential amplifier; said differential amplifier subtracting one signal from the other ($U_X-U_R$), so that the temperature dependence of the two signals $U_X$, $U_R$ cancel out.

13. Surveillance system according to claim 1, wherein the sensor means comprises a non-magnetic, non-electrically conductive protection layer for protection of the magnetoelastic material.

14. Surveillance system according to claim 1, wherein the coil system of at least two sensing devices via a multiplexing unit are connected to an electronic system which alternatively comprises a computer unit or is connected to an external computer unit or that the result of each sensor means can be observed separately.

15. Surveillance system according to claim 1, wherein the sensor system is provided with a shielding structure for protection of the sensor system when mounted externally.

16. Surveillance system according to claim 1, wherein each sensor system comprises separate demodulating electronics.

17. Use of a surveillance system as claimed in claim 1 in slewing rings.

18. A surveillance system for measuring stress on a fastener having a securing means, comprising:
a sensor comprised of a magnetoelastic material;
a sensing device comprising a coil system for exciting said magnetoelastic material, said sensing device at least partly surrounding said sensor;
means for arranging said sensor on said fastener between an object being fastened and said securing means such that said sensor is sensitive to compressive forces created between said securing means and said object when a load is placed on said object by said securing means; and
an electronic system connected to said sensing device for monitoring loads sensed by said sensor.

19. The surveillance system of claim 18, wherein said sensing device is set so as to excite said sensor predominantly by a small angle magnetization rotation process.

20. The surveillance system of claim 18, wherein said arranging means retains said sensor on said fastener such that said sensor is compressed between said securing means and said object when a load is placed on said object by said securing means.

21. The surveillance system of claim 18, wherein said sensor is annular and surrounds said fastener.

22. The surveillance system of claim 18, wherein said magnetoelastic material is excited with a frequency of at least 300 kHz.

23. The surveillance system of claim 18, wherein said magnetoelastic material is excited with a frequency between 500 kHz and 10 MHz.

24. The surveillance system of claim 18, wherein said magnetoelastic material is a magnetoelastic amorphous material.

25. The surveillance system of claim 18, wherein said magnetoelastic material is applied axially on said sensor.

26. The surveillance system of claim 18, wherein said magnetoelastic material comprises magnetoelastic ribbons in the form of a ribbon belt.

27. The surveillance system of claim 18, wherein said sensor comprises a washer.

28. The surveillance system of claim 18, wherein said coil system completely encloses said sensor.

29. The surveillance system of claim 18, wherein said coil system comprises coils for carrying out both an excitation function and a pick-up function.

30. The surveillance system of claim 18, wherein said sensing device includes temperature sensing means and temperature compensation means.

31. The surveillance system of claim 18, wherein said sensing device includes temperature sensing means and temperature compensation means.

32. The surveillance system of claim 31, wherein said temperature sensing means includes a conventional Resistance Temperature Detector attached to the fastener and the temperature compensation means includes an electric feedback loop.

33. The surveillance system of claim 18, wherein said sensor comprises a nonmagnetic, nonelectrically conductive protection layer for protecting the magnetoelastic material.

34. The surveillance system of claim 18, wherein said system includes a plurality of sensors and sensing devices and the electronic system includes means for observing each sensor separately.

35. A method of monitoring stress on a fastener having a securing means, comprising:
arranging a sensor comprised of a magnetoelastic material on said fastener between an object being fastened and said securing means such that said sensor is sensitive to compressive forces created between said securing means and said object when a load is placed on said object by said securing means;
at least partly surrounding said sensor with a sensing device comprising a coil system for exciting said magnetoelastic material; and
connecting an electronic system to said sensing device for monitoring loads sensed by said sensor.

36. The method of claim 35, further comprising the step of exciting said sensor predominantly with a small angle magnetization process.

37. The method of claim 35, wherein said magnetoelastic material is excited with a frequency of at least 300 kHz.

38. The method of claim 35, wherein said magnetoelastic material is excited with a frequency between 500 kHz and 10 MHz.

39. The method of claim 35, wherein said magnetoelastic material is excited with a frequency between 500 kHz and 10 MHz.

* * * * *